(12) United States Patent
Washitani et al.

(10) Patent No.: US 11,676,065 B2
(45) Date of Patent: Jun. 13, 2023

(54) MODEL TRAINING SYSTEM

(71) Applicant: Kabushiki Kaisha Toshiba, Minato-ku (JP)

(72) Inventors: Taisuke Washitani, Yokohama (JP); Yasutomo Shiomi, Koza (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 293 days.

(21) Appl. No.: 16/699,869

(22) Filed: Dec. 2, 2019

(65) Prior Publication Data
US 2020/0193233 A1 Jun. 18, 2020

(30) Foreign Application Priority Data
Dec. 12, 2018 (JP) .............................. JP2018-232189

(51) Int. Cl.
| | | |
|---|---|---|
| *G06N 20/00* | (2019.01) | |
| *G06T 5/00* | (2006.01) | |
| *G06F 18/214* | (2023.01) | |
| *G06F 18/24* | (2023.01) | |
| *G06F 18/21* | (2023.01) | |
| *G06V 10/774* | (2022.01) | |
| *G06V 10/44* | (2022.01) | |

(52) U.S. Cl.
CPC .......... *G06N 20/00* (2019.01); *G06F 18/2148* (2023.01); *G06F 18/2185* (2023.01); *G06F 18/24* (2023.01); *G06T 5/001* (2013.01); *G06V 10/44* (2022.01); *G06V 10/7747* (2022.01); *G06T 2207/20081* (2013.01)

(58) Field of Classification Search
CPC .. G06K 9/6257; G06K 9/6267; G06K 9/6264; G06K 9/4604; G06K 9/6296; G06T 5/001; G06T 2207/20081; G06N 3/08; G06N 20/00
See application file for complete search history.

(56) References Cited

U.S. PATENT DOCUMENTS

| | | | |
|---|---|---|---|
| 7,844,940 B2 * | 11/2010 | Shin | ........................ C40B 40/10 |
| | | | 716/55 |
| 2016/0335536 A1 | 11/2016 | Yamazaki et al. | |
| 2018/0101770 A1 | 4/2018 | Tanaka et al. | |

(Continued)

FOREIGN PATENT DOCUMENTS

| | | |
|---|---|---|
| JP | 2006-301779 A | 11/2006 |
| JP | 2014-178229 A | 9/2014 |

(Continued)

OTHER PUBLICATIONS

Yunchao Wei, et al. "STC: A Simple to Complex Framework for Weakly-Supervised Semantic Segmentation" IEEE Transactions on Pattern Analysis and Machine Intelligence, vol. 39, No. 11, Nov. 2017, pp. 2314-2320.

*Primary Examiner* — Wesley J Tucker

(74) *Attorney, Agent, or Firm* — Oblon, McClelland, Maier & Neustadt, L.L.P.

(57) ABSTRACT

According to one embodiment, a model training system includes a processor. The processor is configured to input a first image to a model and acquire a second image output from the model, and generate a third image by correcting the second image. The processor is configures to train the model by using the first image as input data and using the third image as teacher data.

15 Claims, 14 Drawing Sheets

(56) References Cited

U.S. PATENT DOCUMENTS

| | | | |
|---|---|---|---|
| 2019/0134226 A1* | 5/2019 | Kaspar | A61K 48/0075 |
| 2019/0188462 A1* | 6/2019 | Nishida | G06K 9/6267 |
| 2020/0257937 A1* | 8/2020 | Krasienapibal | G06V 10/7784 |
| 2020/0311895 A1* | 10/2020 | Sakurai | G06T 7/001 |
| 2020/0349677 A1* | 11/2020 | Lee | G06T 3/4046 |
| 2020/0357112 A1* | 11/2020 | Sakai | G06T 7/75 |
| 2020/0364842 A1* | 11/2020 | Chaton | G06N 3/08 |
| 2020/0380362 A1* | 12/2020 | Cao | G06N 3/04 |
| 2021/0080400 A1* | 3/2021 | Kuno | G06N 20/00 |
| 2021/0081716 A1* | 3/2021 | Namioka | G06V 40/20 |
| 2021/0295112 A1* | 9/2021 | Irie | G06K 9/6277 |
| 2021/0374916 A1* | 12/2021 | Kondo | G06N 20/00 |
| 2022/0207857 A1* | 6/2022 | Ishii | G06V 10/14 |
| 2022/0284567 A1* | 9/2022 | Ohya | G06T 7/12 |

FOREIGN PATENT DOCUMENTS

| | | |
|---|---|---|
| JP | WO2015/118686 A1 | 8/2015 |
| JP | 2018-063504 | 4/2018 |
| JP | WO2018/154900 A1 | 8/2018 |
| WO | WO 2018/135516 A1 | 7/2018 |
| WO | WO 2018/168427 A1 | 9/2018 |
| WO | WO 2018/168539 A1 | 9/2018 |

\* cited by examiner

MODEL TRAINING SYSTEM

CROSS-REFERENCE TO RELATED APPLICATIONS

This application is based upon and claims the benefit of priority from Japanese Patent Application No. 2018-232189, filed on Dec. 12, 2018; the entire contents of which are incorporated herein by reference.

FIELD

Embodiments described herein relate generally to a model training system.

BACKGROUND

Supervised learning of a model requires a large amount of data for the training. Therefore, it is desirable to develop technology in which the data quantity necessary for the training can be reduced.

DETAILED DESCRIPTION

Figure 1:
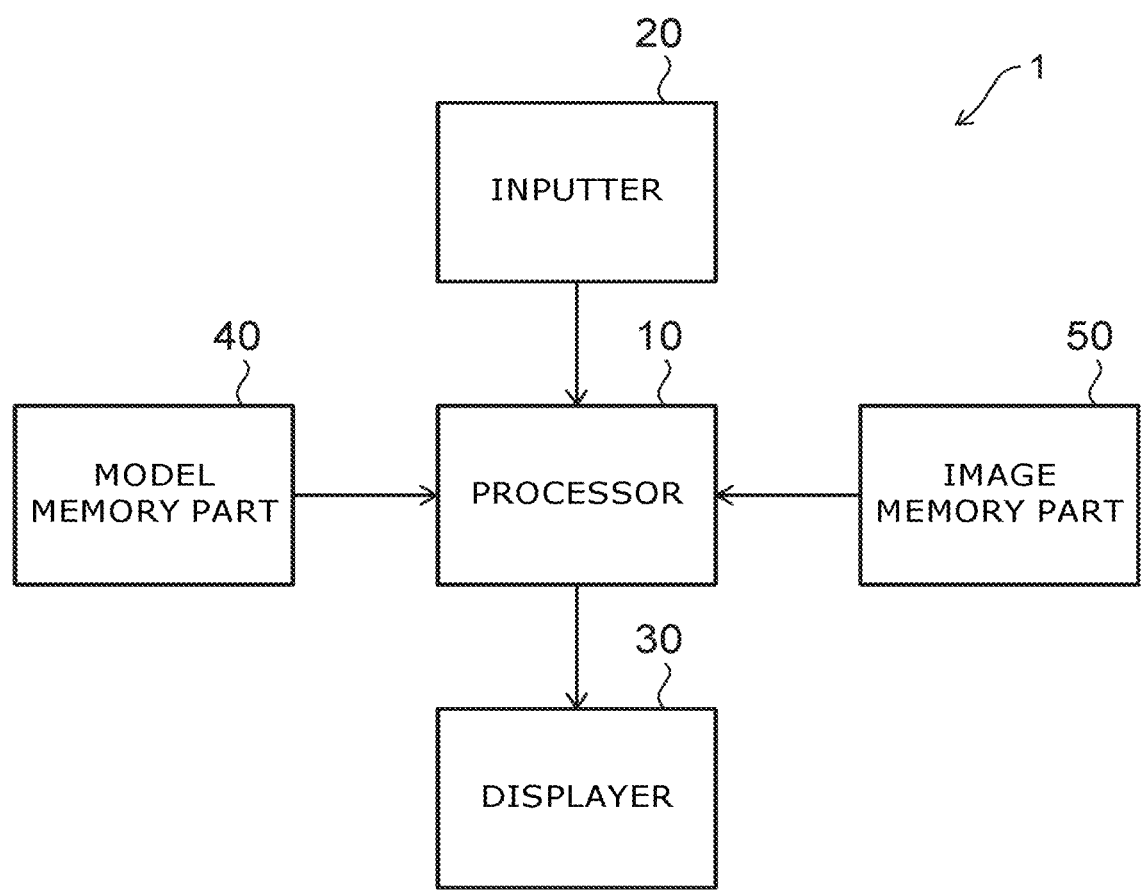
FIG. 1 is a block diagram illustrating the configuration of a model training system according to an embodiment.

According to one embodiment, a model training system includes a processor. The processor is configured to input a first image to a model and acquire a second image output from the model, and generate a third image by correcting the second image. The processor is configures to train the model by using the first image as input data and using the third image as teacher data.

Various embodiments are described below with reference to the accompanying drawings.

In the specification and drawings, components similar to those described previously or illustrated in an antecedent drawing are marked with like reference numerals, and a detailed description is omitted as appropriate.

FIG. 1 is a block diagram illustrating the configuration of a model training system according to an embodiment.

The model training system 1 according to the embodiment includes a processor 10. In the example illustrated in FIG. 1, the model training system 1 further includes an inputter 20, a displayer 30, a model memory 40, and an image memory 50.

The model memory 40 stores a model. The image memory 50 stores images used to train the model. The processor 10 trains the model stored in the model memory 40 by using the images stored in the image memory 50. The processor 10 stores the model in the model memory 40 after training the model.

The model is, for example, a neural network. The processor 10 includes, for example, a processing circuit made of a central processing unit. The model memory 40 and the image memory 50 include, for example, at least one of a hard disk drive (HDD), a network-attached hard disk (NAS), an embedded multimedia card (eMMC), a solid-state drive (SSD), or a solid-state hybrid drive (SSHD). One memory device may function as the model memory 40 and the image memory 50.

The inputter 20 accepts operations of inputting information to the processor 10. The inputter 20 includes, for example, at least one of a keyboard, a touchpad, or a microphone (audio input).

The displayer 30 displays the information transmitted from the processor 10 to a user. The displayer 30 includes, for example, at least one of a monitor or a printer. A touch panel or the like that functions as both the inputter 20 and the displayer 30 may be used.

The processor 10, the inputter 20, the displayer 30, the model memory 40, and the image memory 50 are connected to each other by wired communication, wireless communication, or a network.

Figure 2:
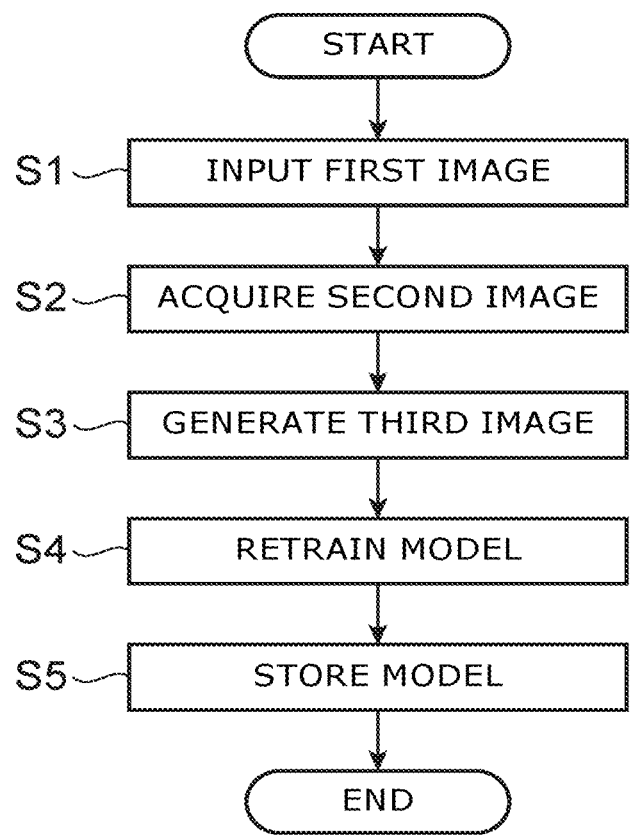
FIG. 2 is a flowchart illustrating an example of the operation of the model training system according to the embodiment.

FIG. 2 is a flowchart illustrating an example of the operation of the model training system according to the embodiment.

FIG. 2 illustrates the operation when a trained model is retrained by the model training system 1.

As illustrated in FIG. 2, the processor 10 accesses the model memory 40 and the image memory 50 and inputs a first image (an input image) to the trained model (step S1). The model is trained to output another image when an image is input. The processor 10 acquires a second image (an output image) output from the model (step S2).

The processor 10 generates a third image (a corrected image) that is different from the second image by correcting the second image (step S3). The processor 10 retrains the model by using the first image as input data and using the third image as teacher data (step S4). The processor 10 stores the trained model in the model memory 40 (step S5).

Effects of the embodiment will now be described.

In the model training system 1 according to the embodiment, the processor 10 generates the third image by correcting the second image obtained based on the trained model and the first image. The model is retrained using the third image as teacher data. Therefore, according to the model training system 1 according to the embodiment, the quantity of the teacher data necessary for retraining can be reduced.

According to the model training system 1 according to the embodiment, the teacher data that is used to retrain is generated based on the input data. Therefore, even in the case where the trend of the data input to the model has changed from the data used when training, the model is retrained to obtain the appropriate output data.

The processor 10 may cause the displayer 30 to display the generated third image. Thereby, the user easily can confirm whether or not the third image is appropriate as teacher data. For example, training of the model that is unintended by the user can be prevented.

First Example

FIG. 3A to FIG. 8C are images illustrating processing according to a model training system according to a first example.

Figure 3A:
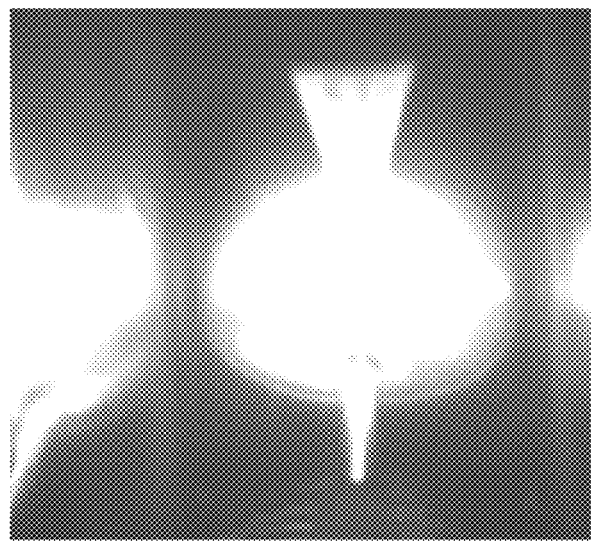
FIGS. 3A and 3B are images illustrating processing according to a model training system according to a first example.
Figure 3B:
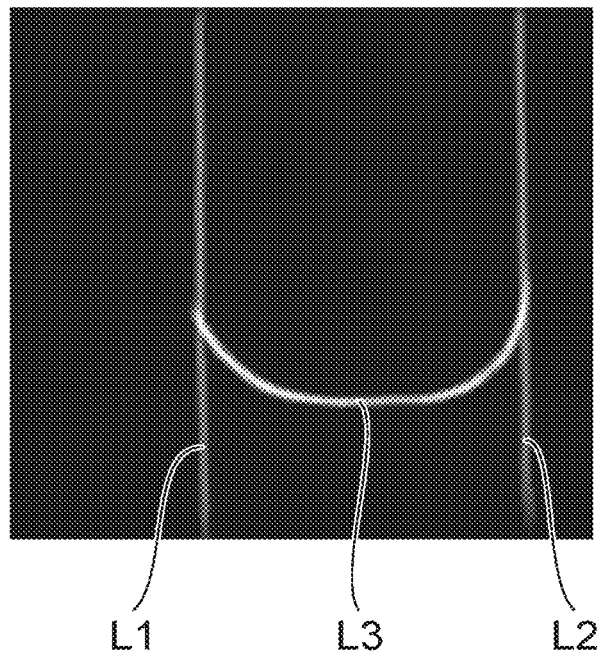

In the first example, an image of the state when welding is input to a model; and another image showing the features of the image is output from the model. FIG. 3A is an example of the image that is imaged. The image of FIG. 3A is imaged when arc-welding a metal member. The processor 10 inputs the image illustrated in FIG. 3A to the model. For example, the model outputs the image that is illustrated in FIG. 3B and shows the features of the image of FIG. 3A. FIG. 3A may be a still image captured from a video image.

A curved line L3 and two lines L1 and L2 along one direction are included in the image illustrated in FIG. 3B. The lines L1 to L3 show the features of the image when welding. For example, in the image of FIG. 3B, the lines L1 and L2 are illustrated by red. The line L3 is illustrated by green. The other portions are illustrated by blue. The processor 10 corrects the image illustrated in FIG. 3B. For example, in the correction, the processor 10 deletes or interpolates lines of features and removes the noise included in the image. One specific correction example will now be described.

Figure 4A:
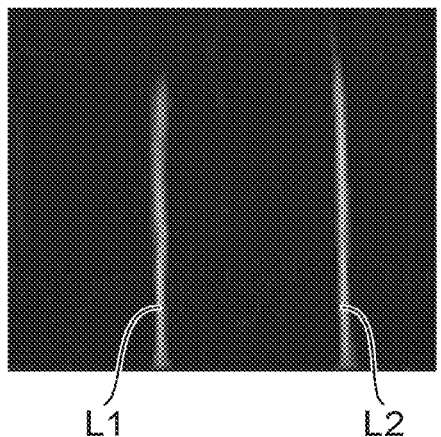
FIG. 4A to 4F are images illustrating processing according to a model training system according to the first example.
Figure 4D:
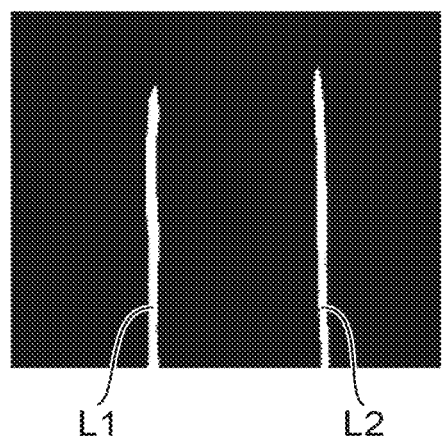
Figure 4B:
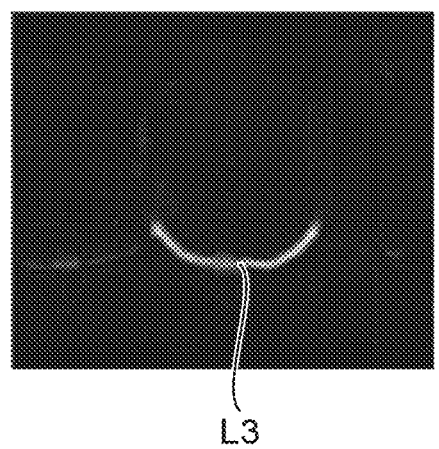
Figure 4E:
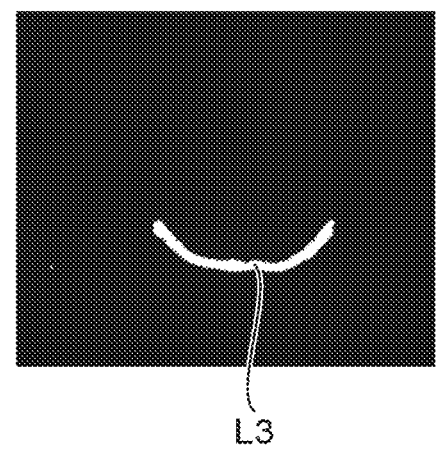
Figure 4C:
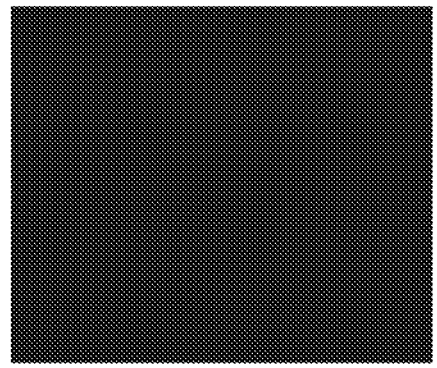

The images of FIG. 4A, FIG. 4B, and FIG. 4C are the image illustrated in FIG. 3B separated into each color. The image of FIG. 4A includes only the lines L1 and L2. The image of FIG. 4B includes only the line L3. The image of FIG. 4C includes only the other components. In the example, substantially nothing is included in the image of FIG. 4C.

Figure 4F:
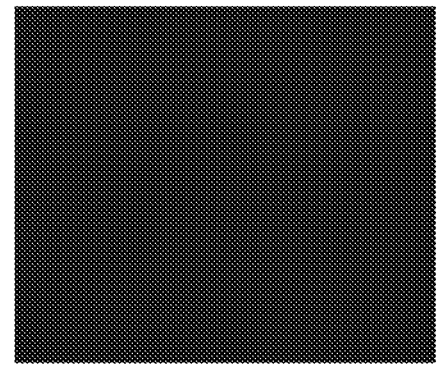

The processor 10 binarizes each image. The binarization is performed so that the luminances of the lines L1 to L3 are different from the luminances of the other portions. The processor 10 applies at least one of reduction processing or enlargement processing to the binary image. For example, the processor 10 applies both reduction processing and enlargement processing to the binary image. The processor 10 may perform the enlargement processing and the reduction processing multiple times. The enlargement processing and the reduction processing may be repeated alternately. The execution sequence of the enlargement processing and the reduction processing is modifiable as appropriate. The processor 10 may apply rotation processing when performing the reduction processing or the enlargement processing. The images illustrated in FIG. 4D to FIG. 4F are generated thereby. The noise inside the image is removed by the reduction processing and the enlargement processing.

Figure 5A:
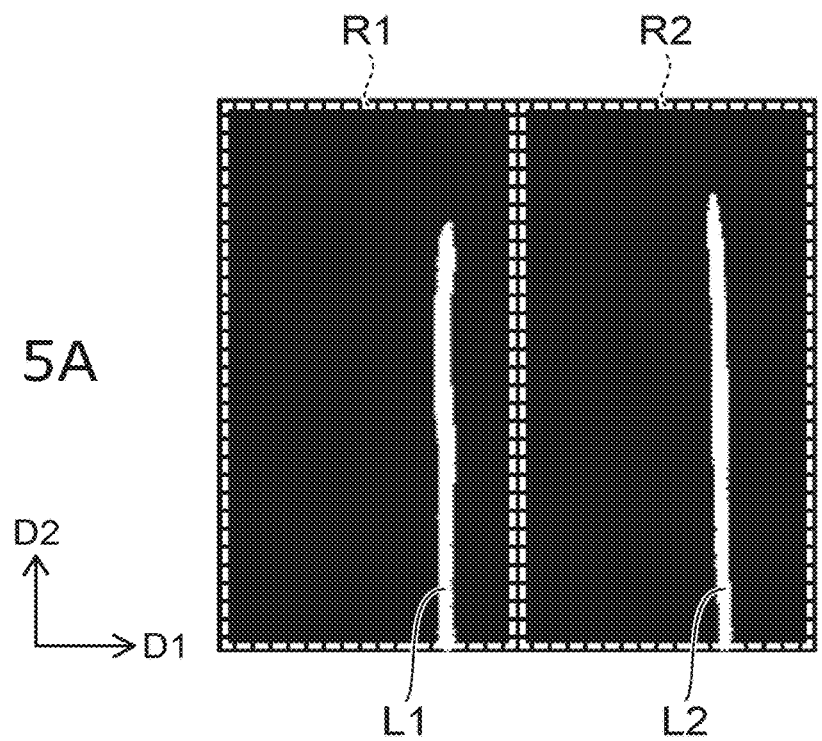
FIG. 5A to 5C are images illustrating processing according to a model training system according to the first example.

As illustrated in FIG. 5A, the processor 10 sets two regions (a region R1 and a region R2) in the image including the lines L1 and L2. The boundary between the region R1 and the region R2 is the center in a first direction D1 of the image. The first direction D1 is the direction connecting the lines L1 and L2. The processor 10 calculates the total of the gray values in a second direction D2 at each point in the first direction D1 for the image including the lines L1 and L2. The second direction D2 is a direction perpendicular to the first direction D1.

Figure 5B:
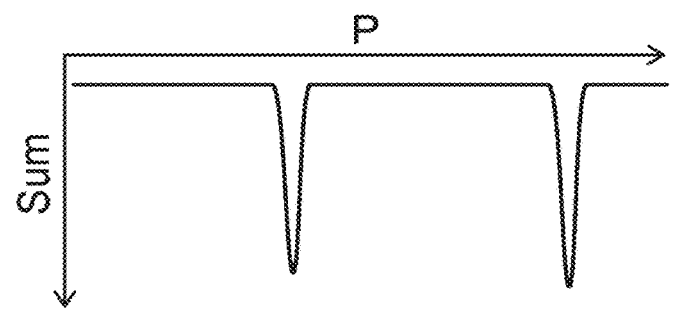

FIG. 5B illustrates the calculation results of the total of the gray values. In FIG. 5B, the horizontal axis is a position P in the first direction D1, the vertical axis is a total Sum of the gray values. The processor 10 detects peaks of the total Sum respectively in the regions R1 and R2. If multiple peaks are detected in the region R1 or R2, only the peak most proximal to the center in the first direction D1 of the image remains; and the other peaks are removed. Thereby, an image is obtained in which only one line exists in each of the regions R1 and R2.

For example, there is a possibility that another line along the one direction other than the lines L1 and L2 may exist in the image output from the model. Lines that are distal to the center are removed by the processing recited above. In the example of FIG. 5A and FIG. 5B, only one peak is detected in each of the regions R1 and R2. Therefore, in the example of FIG. 5A and FIG. 5B, the deletion of peaks is not performed. Then, the processor 10 performs a straight-line approximation of the lines L1 and L2. The image illustrated in FIG. 5A to the image illustrated in FIG. 5C are obtained thereby.

Figure 6A:
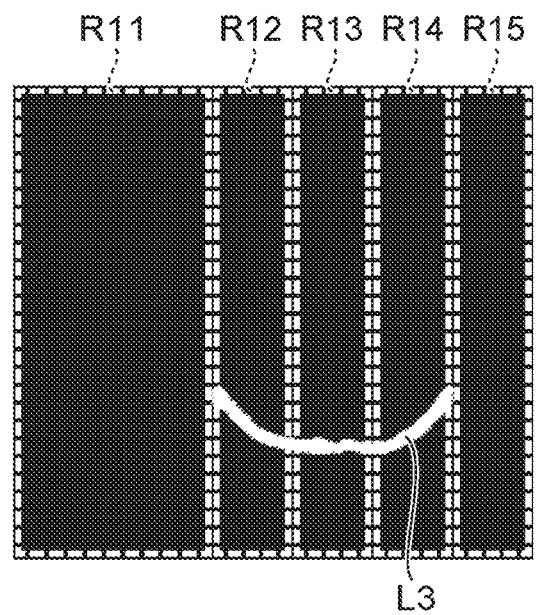
FIG. 6A to 6C are images illustrating processing according to a model training system according to the first example.

Based on the position information of the lines L1 and L2, the processor 10 sets five regions R11 to R15 as illustrated in FIG. 6A for the image illustrated in FIG. 4E. The position of the boundary between the regions R11 and R12 corresponds to the position of the line L1. The position of the boundary between the regions R14 and R15 corresponds to the position of the line L2. The regions R12 to R14 are set by uniformly trisecting the region between the boundary corresponding to the line L1 and the boundary corresponding to the line L2.

When portions of the line L3 exist in the regions R11 and R15, the processor 10 removes such portions. In other words, the processor 10 sets all of the luminances of the pixels included in the regions R11 and R15 to a value corresponding to black. The processor 10 performs a curve approximation of a portion of the line L3 existing in the regions R12 and R14. The processor 10 does not apply processing to the portion of the line L3 existing in the region R13. This processing generates the image illustrated in FIG. 6B.

Figure 5C:
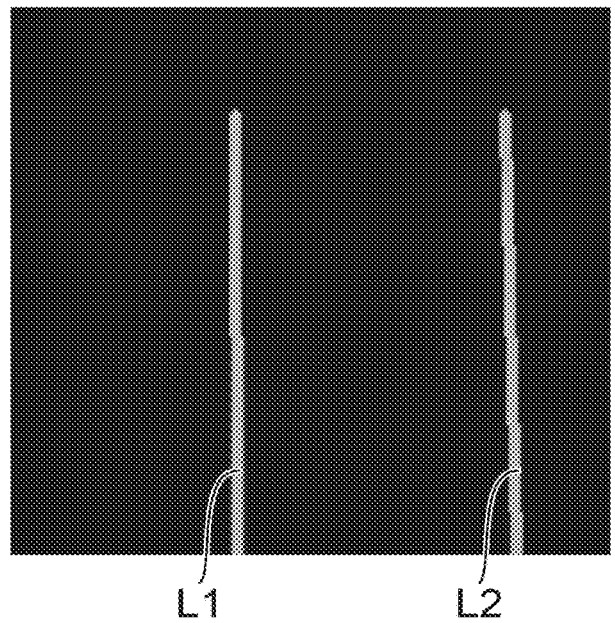
Figure 6B:
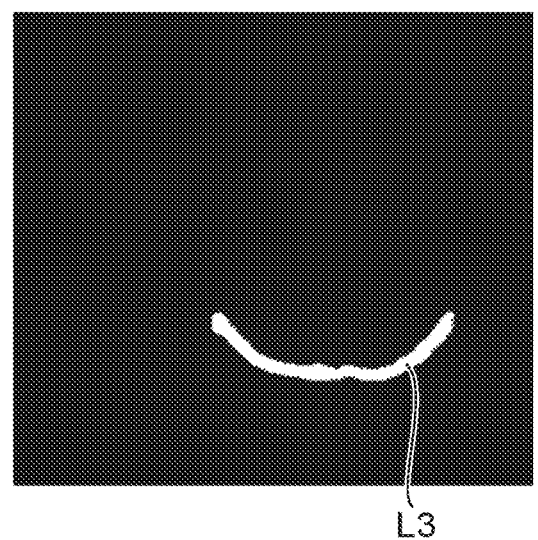
Figure 6C:
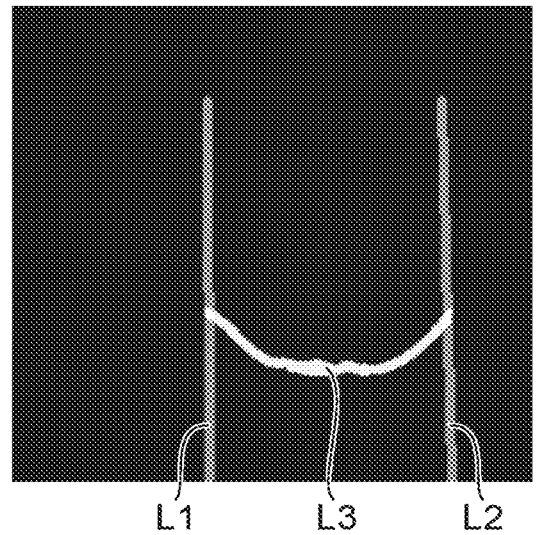

The processor 10 generates the image illustrated in FIG. 6C by merging the image illustrated in FIG. 4F, the image illustrated in FIG. 5C, and the image illustrated in FIG. 6B. The lines L1 to L3 are unclear in the image illustrated in FIG. 3B but have become clear lines due to the correction. The processor 10 trains the model by using the image of FIG. 3A as input data and using the image of FIG. 6C as teacher data.

For example, the quality of a weld is determined in a quality inspection, in-process monitoring, etc., based on the features extracted from an image when welding. In such a case, the quality of the weld cannot be determined accurately when the image from which the features are extracted is unclear or the features cannot be extracted accurately. According to the model training system 1 according to the embodiment, the correction of the image from which the features are extracted deletes the unnecessary lines and clarifies the necessary lines. By training the model by using the corrected image, the model can more accurately extract the features from the image when welding.

FIG. 7A to FIG. 7E and FIG. 8A to FIG. 8C illustrate other examples. The processor 10 inputs the image of FIG. 7A to the model and acquires the image of FIG. 7B. The line L1 is unclear in the image of FIG. 7B. A line L4 is included in the image of FIG. 7B in addition to the lines L1 to L3. The processor 10 generates the image of FIG. 7C by correcting by applying processing similar to that recited above to the image of FIG. 7B. The correction makes the line L1 clear and removes the line L4. The processor 10 trains the model by using the image of FIG. 7A as input data and using the image of FIG. 7C as teacher data.

Figure 7A:
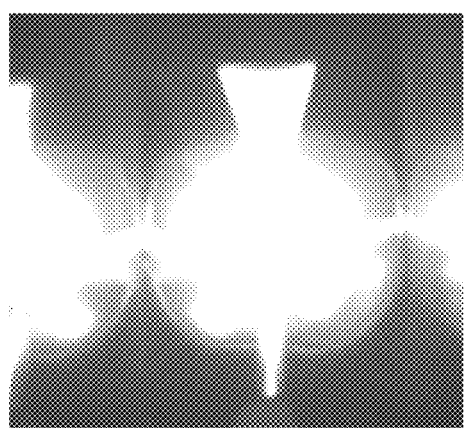
FIG. 7A to 7E are images illustrating processing according to a model training system according to the first example.
Figure 7B:
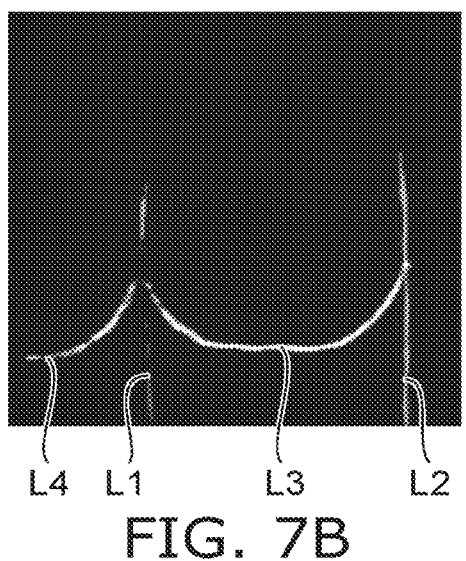
Figure 7D:
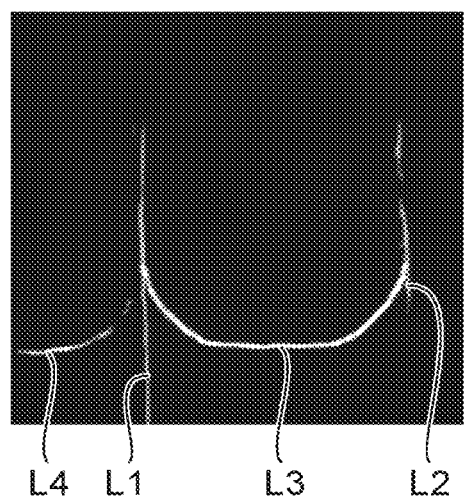
Figure 7C:
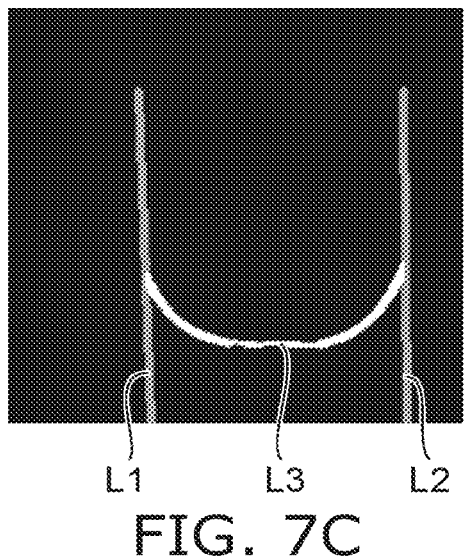
Figure 7E:
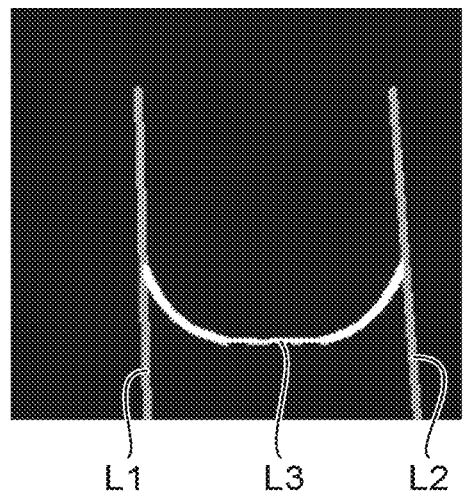

FIG. 7D illustrates the image obtained by inputting the image of FIG. 7A to another model. The line L2 is unclear in the image of FIG. 7D. In the image of FIG. 7D as well, the line L4 is included in addition to the lines L1 to L3. The processor 10 generates the image of FIG. 7E by correcting the image of FIG. 7D. The correction makes the line L2 clear and removes the line L4. The processor 10 trains the model by using the image of FIG. 7A as input data and using the image of FIG. 7E as teacher data.

Figure 8A:
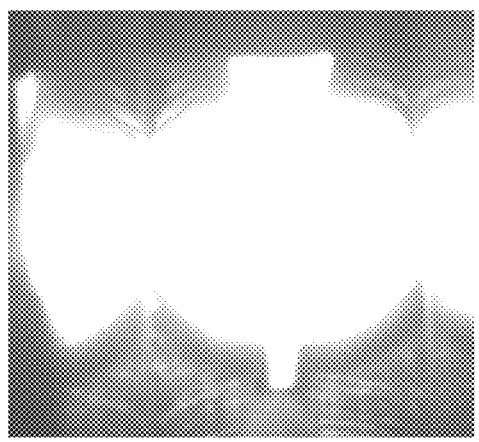
FIG. 8A to 8C are images illustrating processing according to a model training system according to the first example.
Figure 8B:
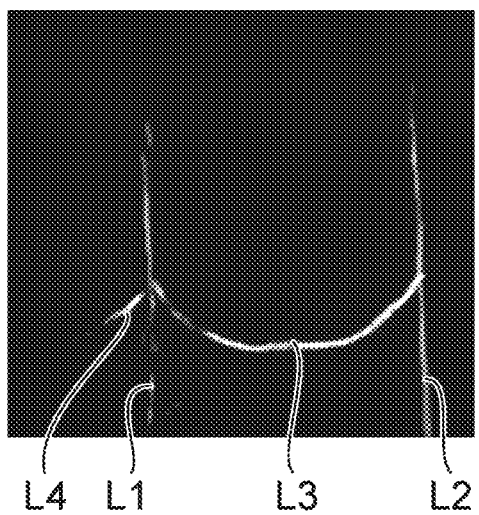
Figure 8C:
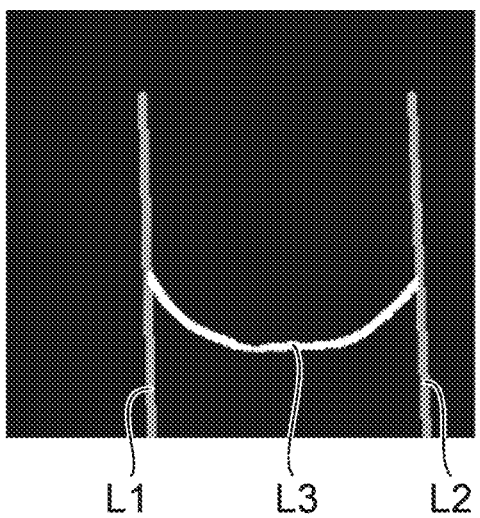

Similarly, the processor 10 inputs the image of FIG. 8A to the model and acquires the image of FIG. 8B. The processor 10 generates the image of FIG. 8C by correcting the image of FIG. 8B. The processor 10 trains the model by using the image of FIG. 8A as input data and using the image of FIG. 8C as teacher data.

Second Example

FIG. 9A to FIG. 11D are images illustrating the processing according to a model training system according to a second example.

Figure 9A:
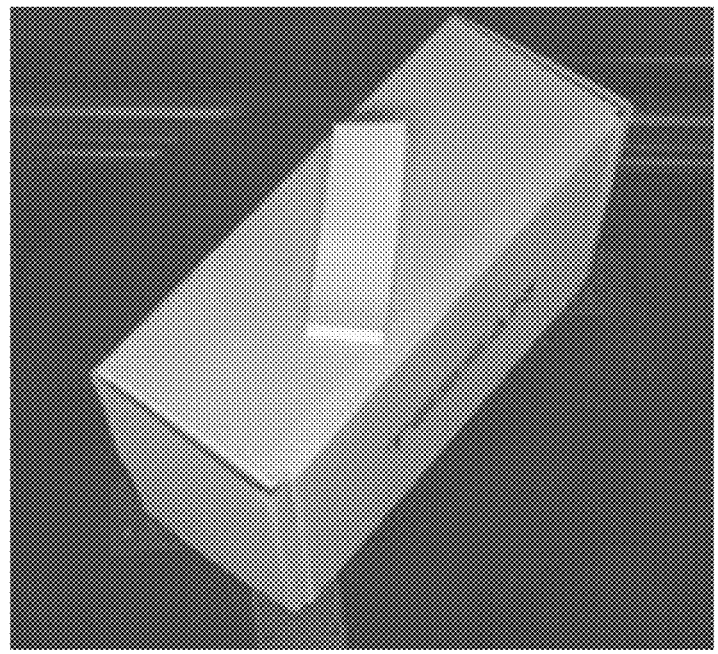
FIGS. 9A and 9B are images illustrating processing according to a model training system according to a second example.

In the second example, an image (a photograph) of corrugated fiberboard is input to a model. The model outputs an image of the corrugated fiberboard in which adhered matter, printed characters, etc., on the corrugated fiberboard are removed from the image. FIG. 9A is an example of the image of the corrugated fiberboard. The model outputs the image illustrated in FIG. 9B by removing the printed characters and things other than the corrugated fiberboard from the image of FIG. 9A. The processor 10 corrects the image illustrated in FIG. 9B. For example, in the correction, the processor 10 makes the shape of the corrugated fiberboard more clear and removes the noise included in the image. One specific correction example will now be described.

Figure 9B:
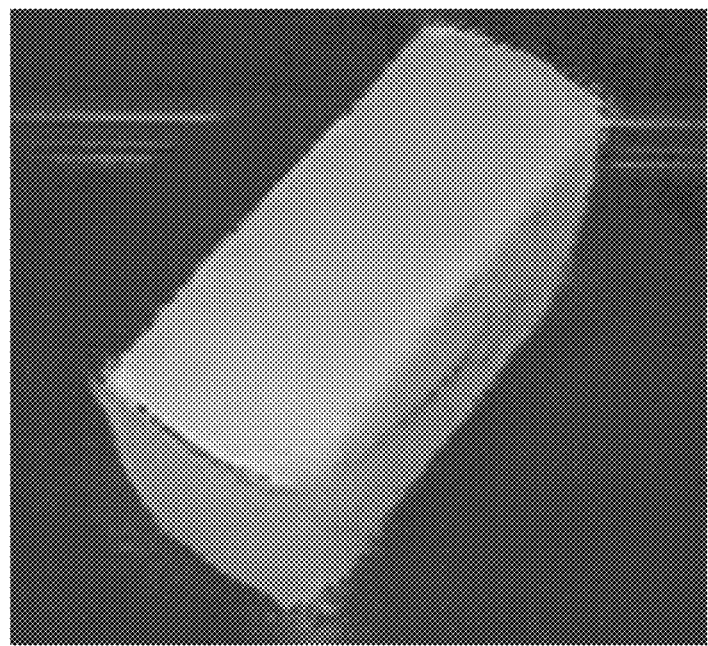
Figure 10A:
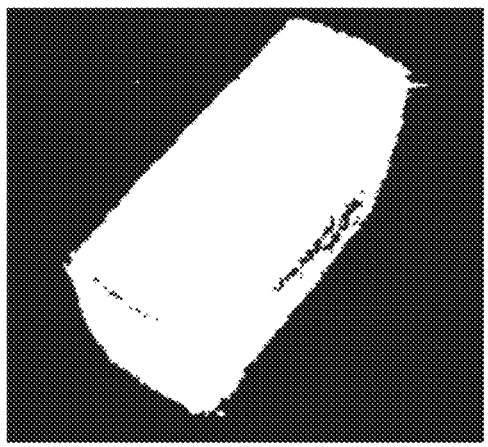
FIG. 10A to 10D are images illustrating the processing according to a model training system according to the second example.
Figure 10B:
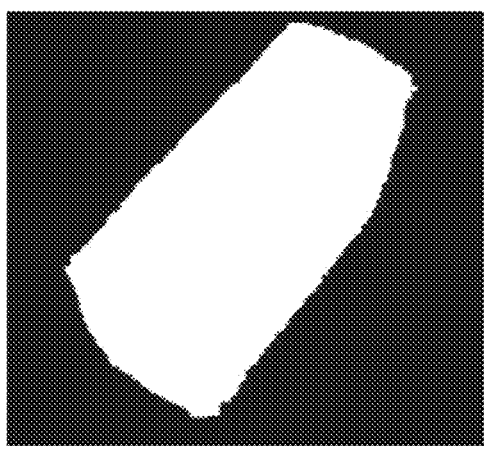
Figure 10C:
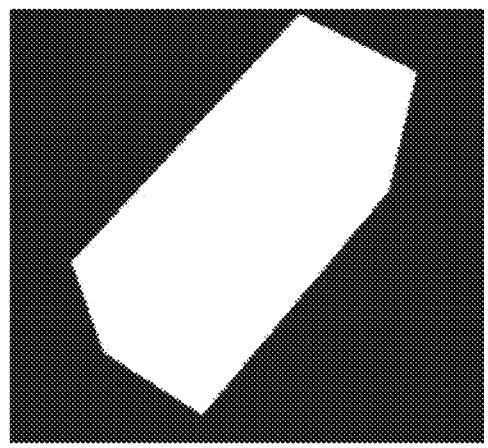
Figure 10D:
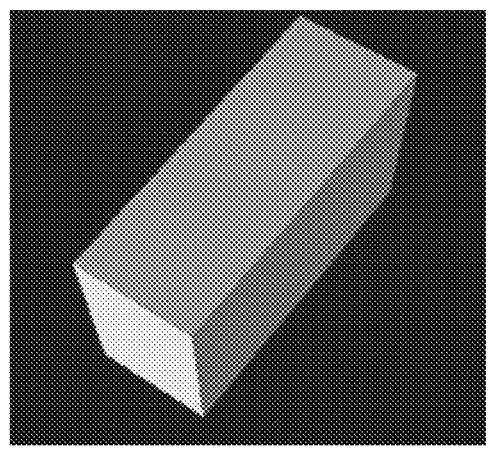

The processor 10 generates the image illustrated in FIG. 10A by binarizing the image illustrated in FIG. 9B. Then, the processor 10 removes the noise and/or the pixels corresponding to the printed characters by applying reduction processing and enlargement processing to the image illustrated in FIG. 10A. The image illustrated in FIG. 10B is generated thereby. The processor 10 generates the image illustrated in FIG. 10C by performing a polygon approximation of the image illustrated in FIG. 10B. Based on the image illustrated in FIG. 10C, the processor 10 performs a shape estimation as illustrated in FIG. 10D. Each surface of the corrugated fiberboard is identified thereby.

Figure 11A:
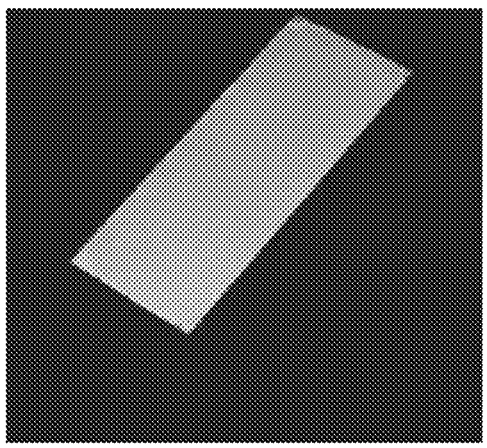
FIG. 11A to 11D are images illustrating the processing according to a model training system according to the second example.
Figure 11B:
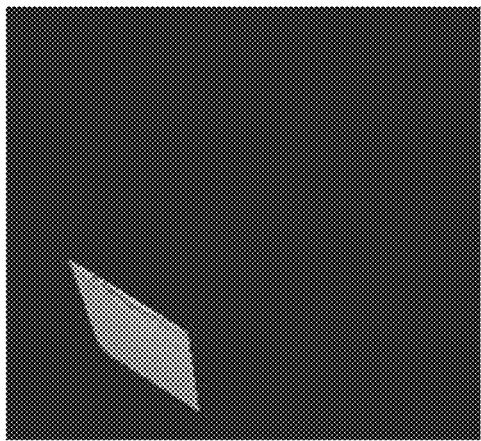
Figure 11C:
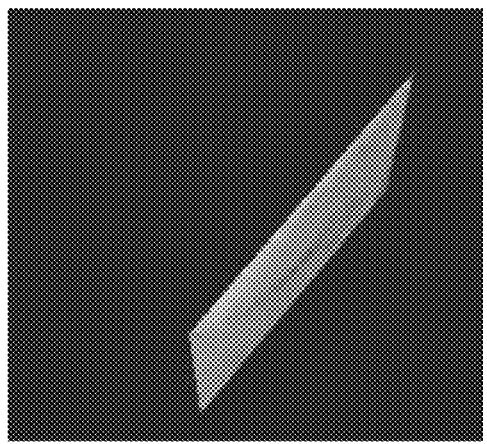
Figure 11D:
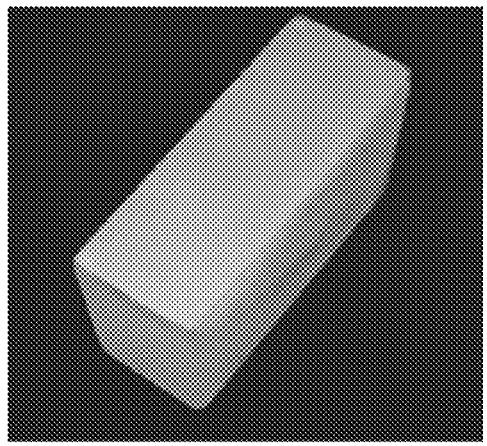

As illustrated in FIG. 11A to FIG. 11C, the processor 10 corrects the color for each surface of the corrugated fiberboard. For example, for each surface of the corrugated fiberboard illustrated in FIG. 10D, the processor 10 corrects the color based on a similar portion inside the image of FIG. 9B. The processor 10 generates the image illustrated in FIG. 11D by merging and smoothing the images illustrated in FIG. 11A to FIG. 11C. The processor 10 trains the model by using the image of FIG. 9A as input data and using the image of FIG. 11D as teacher data.

As described above, according to the second example, the adhered matter and the printed characters are removed from the image of the corrugated fiberboard; and an image of the corrugated fiberboard itself is generated. For example, from the image of the corrugated fiberboard itself, it is easy to confirm the existence of depressions, scratches, etc., in the corrugated fiberboard.

As shown in the examples described above, the model training system 1 according to the embodiment is used particularly favorably in industrial applications. In industrial applications, it is favorable to correct the second image by performing at least one of first processing of binarizing the second image and applying the reduction processing and the enlargement processing, or second processing of applying approximate processing to the second image. This is because the processing makes the image more clear; and the features of the design information and/or the processes are reflected in the image more easily.

Figure 12:
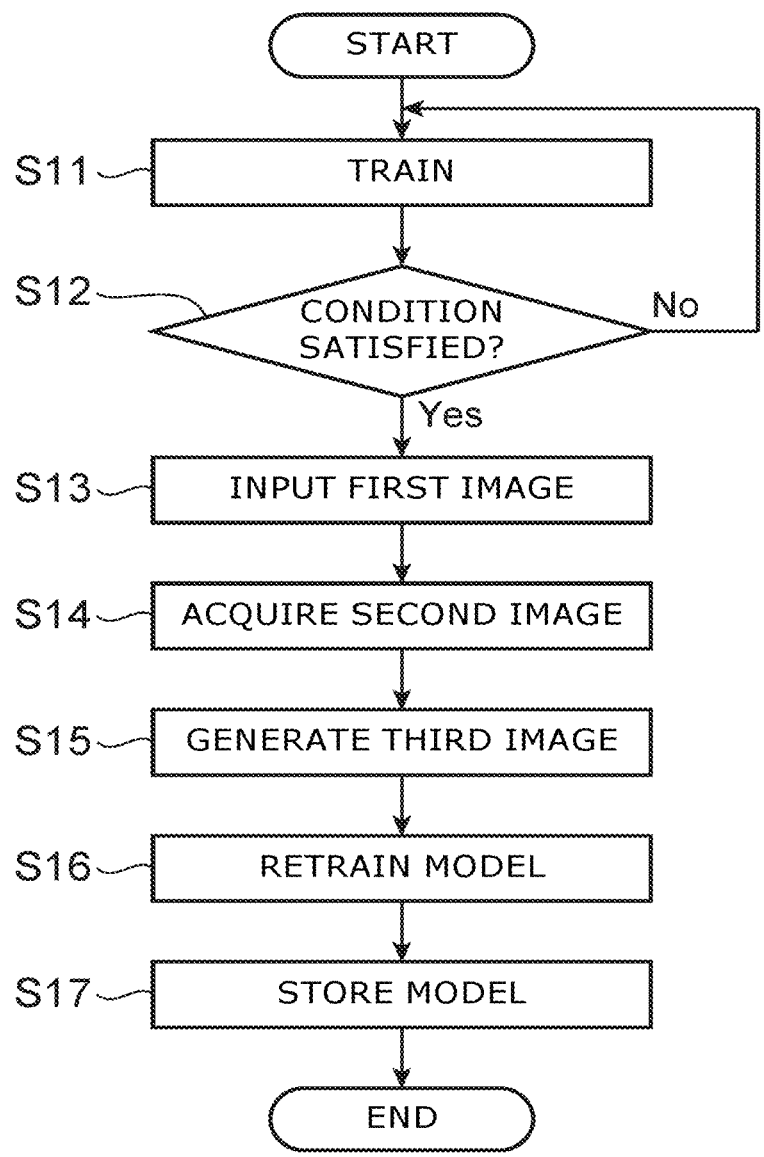
FIG. 12 is a flowchart illustrating another example of the operation of the model training system according to the embodiment.

FIG. 12 is a flowchart illustrating another example of the operation of the model training system according to the embodiment.

The flowchart illustrated in FIG. 12 includes an operation when an untrained model is trained by the model training system 1.

The processor 10 trains the model by using an input image (e.g., a first training image) and a teacher image (e.g., a second training image) (step S11). The processor 10 determines whether or not a prescribed condition for the training of the model is satisfied (step S12). If the condition is satisfied, the processor 10 ends the training of the model and proceeds to step S13. If the condition is not satisfied, the processor 10 repeats step S11 until the condition is satisfied. For example, the condition is when all of the preregistered input images and teacher images are trained. The condition may be the input of an operation by the user to end the training.

When the training of the model is completed, the model training system 1 retrains the model as appropriate while acquiring the image by using the model. The subsequent steps S13 to S17 are similar to steps S1 to S5 of the flowchart illustrated in FIG. 2. In other words, the processor 10 inputs the first image to the trained model (step S13) and acquires the second image (step S14). The processor 10 generates the third image by correcting the second image (step S15). The processor 10 retrains the model by using the first image as input data and using the third image as teacher data (step S16). The processor 10 stores the trained model in the model memory 40 (step S17).

Figure 13:
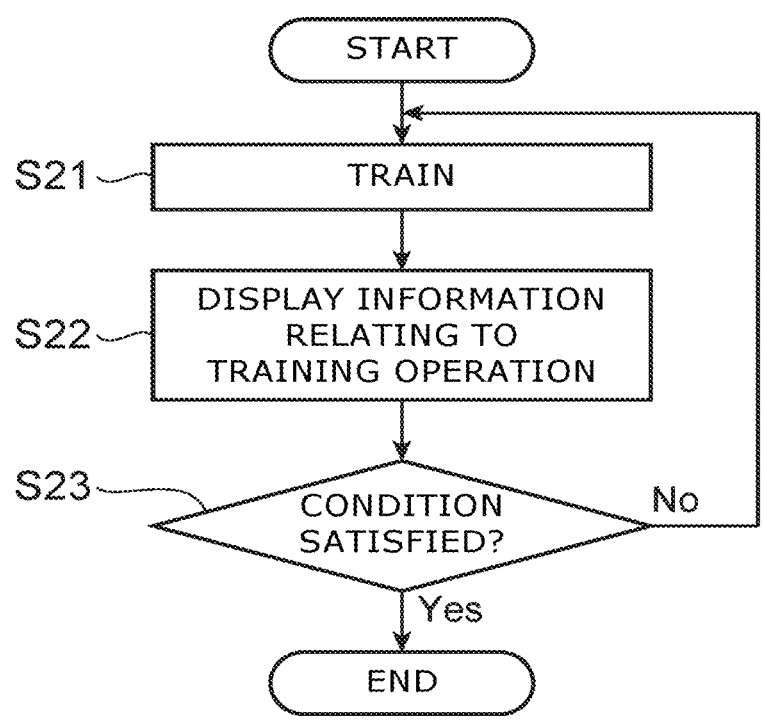
FIG. 13 is a flowchart illustrating another example of the operation of the model training system according to the embodiment.

FIG. 13 is a flowchart illustrating another example of the operation of the model training system according to the embodiment.

As described above, the processor 10 can generate the corrected image based on the output image output from the model and perform a training operation including training the model using the corrected image as teacher data. The model training system 1 according to the embodiment may display information relating to the training operation. The information is used by the user to decide to switch from the training of step S11 to the training operation of steps S13 to S16 in the flowchart illustrated in FIG. 12.

As illustrated in FIG. 13, the processor 10 trains the model (step S21). The processor 10 causes the displayer 30 to display the information relating to the training operation (step S22). Subsequently, for example, the processor 10 determines whether or not a prescribed condition is satisfied for the training of the model (step S23). The processor 10 repeats steps S21 and S22 until the condition is satisfied. For example, after the condition is satisfied, the processor 10 may perform the training operation (e.g., steps S13 to S16 of the flowchart of FIG. 12).

For example, the information that relates to the training operation includes an evaluation value for performing the training operation. For example, a lower evaluation value indicates that the training operation is recommended. A higher evaluation value indicates that the training operation is not recommended. The information may include recommending-information that recommends the training operation or non-recommending-information that does not recommend the training operation. For example, the recommending-information includes a sentence indicating that the training operation is recommended; and the non-recommending-information includes a sentence indicating that the training operation is not recommended.

According to the training operation, as described above, the data quantity necessary for training can be reduced. However, because the teacher image is generated based on the output image output from the model, an appropriate teacher image is not obtained unless the model is trained sufficiently. Accordingly, it is desirable for the training operation to be performed after sufficiently training the model. For example, the model training system 1 according to the embodiment displays the information relating to the training operation to the user. Based on the information, the user can determine the timing for switching to the training operation recited above from the normal training requiring the paired data of the input image and the teacher image. The convenience of the user can be improved thereby.

For example, the processor 10 trains the model by using some input image and some teacher image. The processor 10 inputs the input image to the model before or after training and obtains the output image output from the model. The processor 10 calculates the difference between the teacher image and the output image. For example, a method such as mean squared error or the like is used to calculate the difference.

Subsequently, the processor 10 trains the model by using another input image and another teacher image. The processor 10 inputs the other input image to the model before or after training and obtains another output image output from the model. The processor 10 calculates the difference between the other teacher image and the other output image. Similarly thereafter, the difference between the teacher image and the output image is calculated when training.

The processor 10 calculates the change of these differences. For example, the processor 10 uses the proportion of the change or the amount of the change as an evaluation value. In such a case, a large evaluation value indicates that the training of the model is insufficient; and a small evaluation value indicates that the training of the model is sufficient. For example, by the evaluation value being displayed, the user can decide to switch to the training operation recited above based on the evaluation value.

Or, the processor 10 may display non-recommending-information when the evaluation value exceeds a prescribed threshold. The processor 10 may display recommending-information when the evaluation value is not more than a prescribed threshold. By the recommending-information or the non-recommending-information being displayed, the user easily can decide to switch to the training operation recited above.

Also, a value that indicates the change of the image due to the correction may be used as the evaluation value.

For example, when training a model by using some input image, the processor 10 inputs the input image to the model before or after training and obtains the output image. The processor 10 generates a corrected image by correcting the output image. The processor 10 calculates the difference between the output image and the corrected image.

Subsequently, when training the model using another input image, the processor 10 inputs the other input image to the model before or after training and obtains another output image. The processor 10 generates another corrected image by correcting the other output image. The processor 10 calculates the difference between the other output image and the other corrected image.

The processor 10 calculates the change of these differences. The processor 10 may use the proportion of the change or the amount of the change obtained by the calculation as the evaluation value. In such a case as well, a large evaluation value indicates that the training of the model is insufficient; and a small evaluation value indicates that the training of the model is sufficient. If the training of the model is insufficient, the image that is output from the model easily becomes unclear or has features that are not reflected appropriately. Such an image is greatly modified by the correction. Accordingly, insufficient training of the model causes the difference between the output image and the corrected image also to increase. An evaluation value that is based on the change of the difference also can be used to appropriately notify the user that the training operation is recommended or not recommended.

Figure 14:
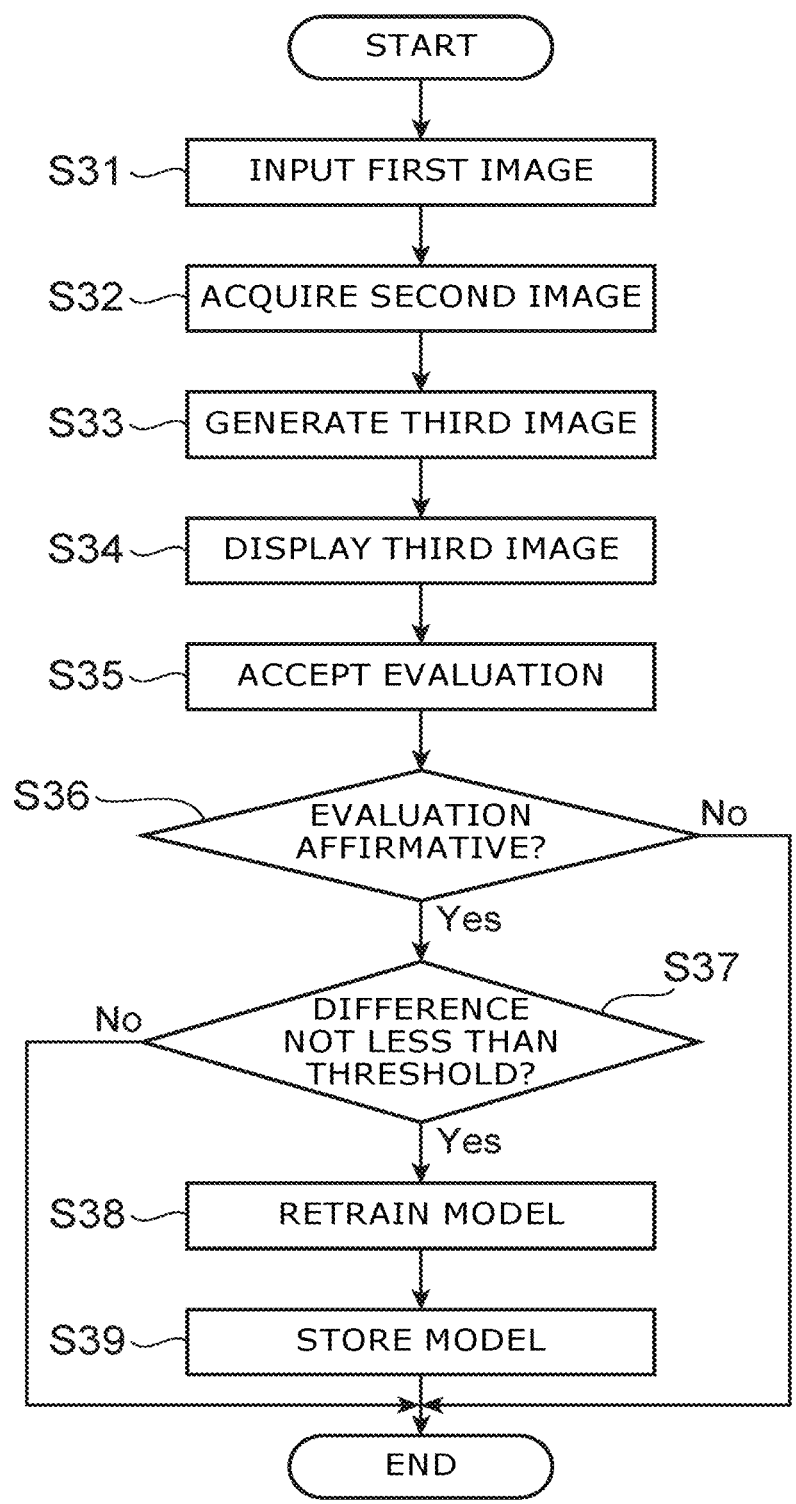
FIG. 14 is a flowchart illustrating another example of the operation of the model training system according to the embodiment.

FIG. 14 is a flowchart illustrating another example of the operation of the model training system according to the embodiment.

The processor 10 may accept an evaluation from the user for the training of the model using the third image (the corrected image). Steps S31 to S33 of the flowchart illustrated in FIG. 14 are similar to steps S1 to S3 of the flowchart illustrated in FIG. 2. Then, the processor 10 causes the displayer 30 to display the third image (step S34).

The user confirms the third image and inputs an evaluation relating to the third image by using the inputter 20. The processor 10 accepts the evaluation from the user (step S35). The processor 10 determines whether or not the evaluation is affirmative (step S36). When the evaluation is not affirmative, the processor 10 does not retrain the model; and the processing ends.

When the evaluation is affirmative, the processor 10 calculates the difference between the second image and the third image. The processor 10 determines whether or not the difference exceeds a prescribed threshold (step S37). When the difference exceeds the threshold, the processor 10 retrains the model using the first image as input data and the third image as teacher data (step S38). The processor 10 stores the retrained model (step S39). When the difference is not more than the threshold, the processor 10 ends the processing.

According to the operation illustrated in FIG. 14, only a third image that is appropriate as teacher data is used to retrain the model. Therefore, the model can be trained appropriately so that the result intended by the user can be output better.

In the operation illustrated in FIG. 14, when the evaluation for the third image is affirmative, the processor 10 may perform step S38 regardless of the difference between the second image and the third image. However, a small difference indicates that a sufficiently desirable image is output from the model. Accordingly, there is little need to perform the retraining using the third image. By determining whether or not to retrain based on the difference, the useless retraining of the model can be suppressed. The calculation amount of the processor 10 can be reduced thereby. The decrease of the generalization of the model due to the model being overtrained can be suppressed.

The embodiments may include the following aspects.

Aspect 1

A model training system, comprising a processor configured to perform a training operation including generating a corrected image based on an output image output from a model and training the model by using the corrected image as teacher data, the processor outputting information relating to the training operation when training the model.

Aspect 2

The model training system according to Aspect 1, wherein the information includes an evaluation value for the performing of the training operation.

Aspect 3

The model training system according to Aspect 1, wherein the processor calculates an evaluation value for the performing of the training operation when training the model, and when the evaluation value exceeds a prescribed threshold, the processor outputs the information including recommending-information recommending the performing of the training operation.

Aspect 4

A model training method, comprising:

inputting a first image to a model and acquiring a second image output from the model;

generating a third image by correcting the second image; and training the model by using the first image as input data and using the third image as teacher data.

Aspect 5

A storage medium storing a program, the program causing a processing device to:

input a first image to a model and acquire a second image output from the model;

generate a third image by correcting the second image; and train the model by using the first image as input data and using the third image as teacher data.

According to the model training system and the model training method according to the embodiments described above, the data quantity necessary for training the model can be reduced. Similarly, by using a program for causing a computer to operate as the model training system, the data quantity necessary for training the model can be reduced.

A case is described in the description recited above where images are used as the input data and the teacher data. However, the model training system, the model training method, the program, and the storage medium according to the embodiments are applicable also to models to which data other than images is input. For example, a sentence may be input to the model. Such a model outputs a second sentence when a first sentence is input. The processor 10 generates a third sentence by correcting the second sentence. The processor 10 trains the model using the first sentence as input data and using the third sentence as teacher data. The data quantity necessary for training the model can be reduced thereby.

For example, the processing of the various data recited above is executed based on a program (software). For example, a computer stores the program and performs the processing of the various information recited above by reading the program.

The processing of the various information recited above may be recorded in a magnetic disk (a flexible disk, a hard disk, etc.), an optical disk (CD-ROM, CD-R, CD-RW, DVD-ROM, DVD±R, DVD±RW, etc.), semiconductor memory, or another recording medium as a program that can be executed by a computer.

For example, the information that is recorded in the recording medium can be read by a computer (or an embedded system). The recording format (the storage format) of the recording medium is arbitrary. For example, the computer reads the program from the recording medium and causes a CPU to execute the instructions recited in the program based on the program. The computer may acquire (or read) the program via a network.

The processor according to the embodiments includes one or multiple devices (e.g., a personal computer, etc.). The processor according to the embodiments may include multiple devices connected by a network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A training system, comprising:
processing circuitry configured to
input a first image to the neural network and acquire a second image output from the neural network;
generate a third image by correcting the second image; and
input the first image to the neural network in a state in which the third image is set to teacher data so as to perform supervised learning of the neural network.

2. The system according to claim 1, further comprising a display displaying the third image.

3. The system according to claim 1, wherein
the processing circuitry is further configured to correct the second image by performing at least one of first processing or second processing,
the first processing includes binarizing the second image and applying at least one of reduction processing or enlargement processing, and
the second processing includes applying approximate processing to the second image.

4. A training system, comprising:
processing circuitry configured to
train a neural network by supervised learning, a first training image being input to the neural network, a second training image being set as teacher data, and the neural network being trained so that output data from the neural network becomes close to the teacher data;
input a first image to the neural network and acquire a second image output from the neural network;
generate a third image by correcting the second image; and input the first image to the neural network in a state in which the third image is set to the teacher data so as to perform supervised learning of the neural network.

5. The system according to claim 4, further comprising a display displaying the third image.

6. The system according to claim 4, wherein
the processing circuitry is further configured to correct the second image by performing at least one of first processing or second processing,
the first processing includes binarizing the second image and applying at least one of reduction processing or enlargement processing, and
the second processing includes applying approximate processing to the second image.

7. A training system, comprising:
processing circuitry configured to input a first image to a trained neural network, acquire a second image output from the neural network, and generate a third image by correcting the second image;
a display displaying the third image, wherein
the processing circuitry is further configured to accept an evaluation relating to the third image, and
based on the evaluation, the processing circuitry is further configured to perform a training operation of training the model by using the first image as input data and using the third image as teacher data.

8. The system according to claim 7, wherein when the evaluation is affirmative for the third image, the processing circuitry is further configured to calculate a difference between the second image and the third image, and perform the training operation when the difference exceeds a prescribed threshold.

9. The system according to claim 7, wherein
the processing circuitry is further configured to correct the second image by performing at least one of first processing or second processing,
the first processing includes binarizing the second image and applying at least one of reduction processing or enlargement processing, and
the second processing includes applying approximate processing to the second image.

10. The system according to claim 1, wherein
the first image shows a metal member being welded, and
the second image includes a feature of the welding.

11. The system according to claim 10, wherein the second image includes a pair of lines and a curved line positioned between the pair of lines.

12. The system according to claim 4, wherein
the first image shows a metal member being welded, and
the second image includes a feature of the welding.

13. The system according to claim 12, wherein the second image includes a pair of lines and a curved line positioned between the pair of lines.

14. The system according to claim 7, wherein
the first image shows a metal member being welded, and
the second image includes a feature of the welding.

15. The system according to claim 14, wherein the second image includes a pair of lines and a curved line positioned between the pair of lines.

* * * * *